(12) United States Patent
Mensch

(10) Patent No.: US 10,139,511 B2
(45) Date of Patent: Nov. 27, 2018

(54) STAGGERED SOURCE ARRAY CONFIGURATION SYSTEM AND METHOD

(71) Applicant: CGG SERVICES SA, Massy (FR)

(72) Inventor: Thomas Mensch, Paris (FR)

(73) Assignee: CGG SERVICES SAS, Massy (FR)

( * ) Notice: Subject to any disclaimer, the term of this patent is extended or adjusted under 35 U.S.C. 154(b) by 171 days.

(21) Appl. No.: 15/170,079

(22) Filed: Jun. 1, 2016

(65) Prior Publication Data

US 2016/0356907 A1  Dec. 8, 2016

Related U.S. Application Data

(60) Provisional application No. 62/170,204, filed on Jun. 3, 2015.

(51) Int. Cl.
*G01V 1/38* (2006.01)

(52) U.S. Cl.
CPC .................. *G01V 1/3808* (2013.01)

(58) Field of Classification Search
CPC .................................... G01V 1/3808
USPC ........................................... 367/15
See application file for complete search history.

(56) References Cited

U.S. PATENT DOCUMENTS

| | | | |
|---|---|---|---|
| 6,545,944 B2 | 4/2003 | De Kok | |
| 6,906,981 B2 * | 6/2005 | Vaage | G01V 1/006 181/110 |
| 6,961,284 B2 * | 11/2005 | Moldoveanu | G01V 1/006 181/118 |
| 7,948,825 B2 | 5/2011 | Moldoveanu | |
| 8,588,025 B2 | 11/2013 | Moldoveanu et al. | |
| 2002/0181328 A1 | 12/2002 | De Kok | |
| 2011/0002193 A1 | 1/2011 | Storteig et al. | |
| 2013/0170316 A1 | 7/2013 | Mandroux | |
| 2013/0188448 A1 | 7/2013 | Siliqi et al. | |
| 2013/0208564 A1 | 8/2013 | Ni et al. | |
| 2014/0241118 A1 | 8/2014 | Landais et al. | |

(Continued)

FOREIGN PATENT DOCUMENTS

| | | |
|---|---|---|
| WO | 0175481 A2 | 10/2001 |
| WO | 2014195505 A2 | 12/2014 |
| WO | 2015011247 A1 | 1/2015 |

OTHER PUBLICATIONS

Dessa et al., "Deep seismic imaging of the eastern Nankai trough, Japan, from multifold ocean bottom seismometer data by combined travel time tomography and prestack depth migration," Journal of Geophysical Research, Feb. 2004, vol. 109, No. B2.

(Continued)

*Primary Examiner* — Daniel L Murphy
(74) *Attorney, Agent, or Firm* — Patent Portfolio Builders PLLC

(57) ABSTRACT

Method and system for acquiring seismic data. The marine seismic acquisition system includes a first vessel that follows an inline direction (X); a first source array (S1) configured to generate first seismic waves; and a second source array (S2) configured to generate second seismic waves. The first and second source arrays are towed by the first vessel along the inline direction (X) and a first inline distance (d) between (i) a first center of source (CS1) of the first source array (S1) and (ii) a second center of source (CS2) of the second source array (S2) is different from zero.

20 Claims, 17 Drawing Sheets

(56) References Cited

U.S. PATENT DOCUMENTS

2014/0355379 A1    12/2014  Moldoveanu et al.
2015/0160360 A1     6/2015  Leveille et al.

OTHER PUBLICATIONS

Halliday et al., "Full-wavefield, towed-marine seismic acquisition and applications," SEG Technical Program Expanded Abstracts 2012, SEG Las Vegas 2012 Annual Meeting, Sep. 2012.
Mandroux et al., "Broadband, long-offset, full-azimuth, staggered marine acquisition in the Gulf of Mexico," First Break, Jun. 2013, vol. 31.
Mensch et al., "Acquisition of high shot density blended seismic data: a WAZ sea trial," 76th EAGE Conference & Exhibition 2014, Jun. 16-19, 2014, Amsterdam RAI, NL.
Moldoveanu et al., "Simultaneous Shooting for Marine Acquisition—Could We Catch Up with Land?" 75th EAGE Conference & Exhibition incorporating SPE EUROPEC 2013, Jun. 10-13, 2013, London, UK.
Extended European Search Report in corresponding European Application No. 16305631.0 dated Oct. 19, 2016. (References US2014355379 A1 and WO2015011427 A1 were submitted with an Information Disclosure Statement dated Jun. 1, 2016).
F. Mandroux; "Staggered marine acquisition design for complex imaging"; SEG Technical Program Expanded Abstracts 2013; CP055236763; Aug. 19, 2013; pp. 26-30; Houston, TX.

\* cited by examiner

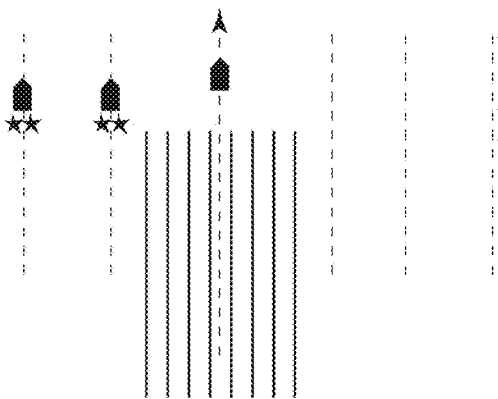
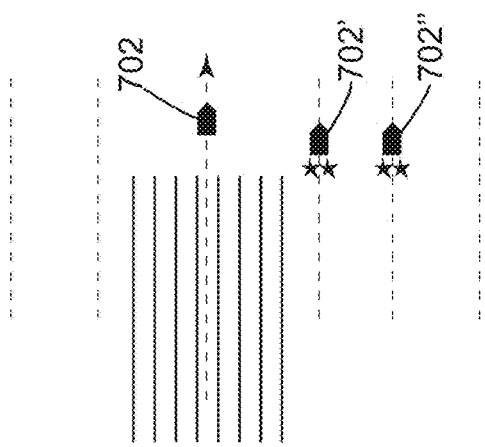
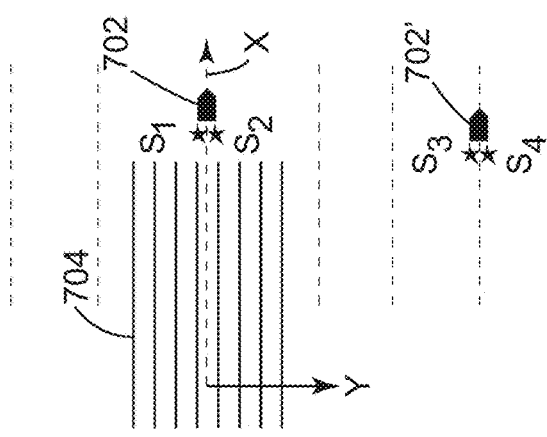

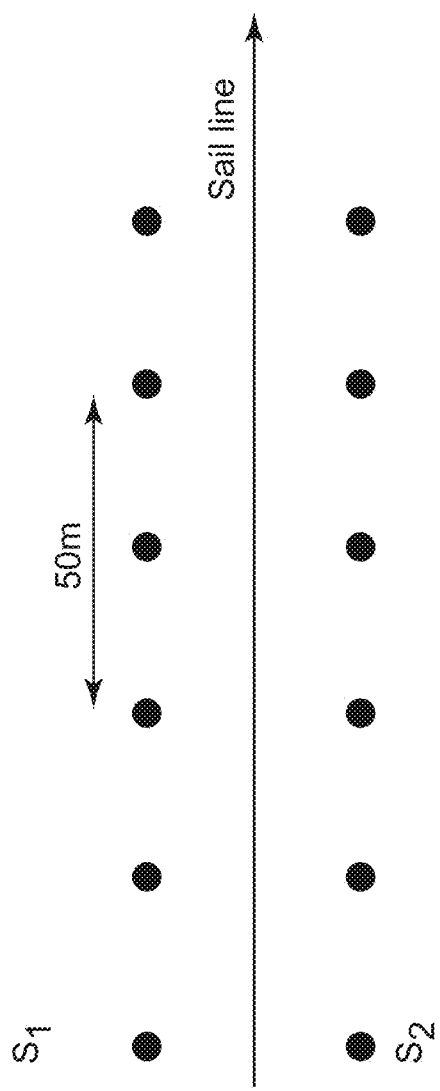

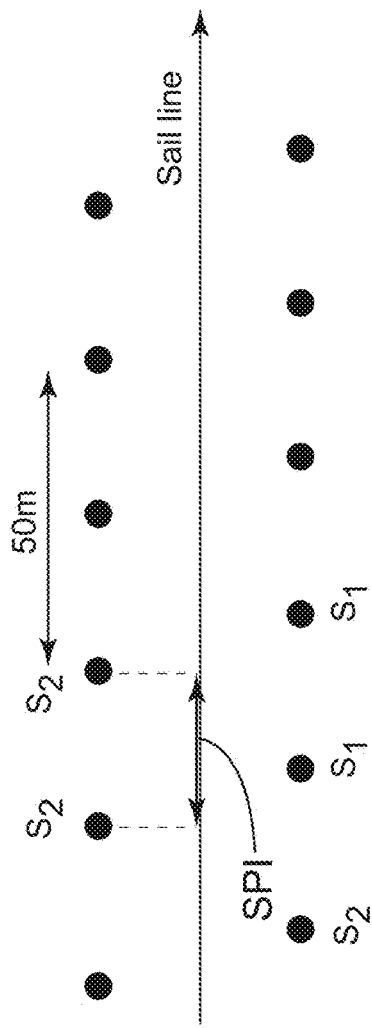
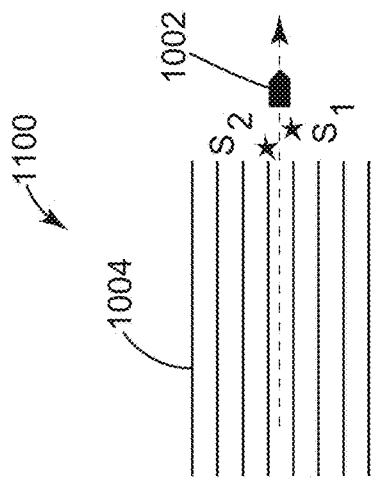

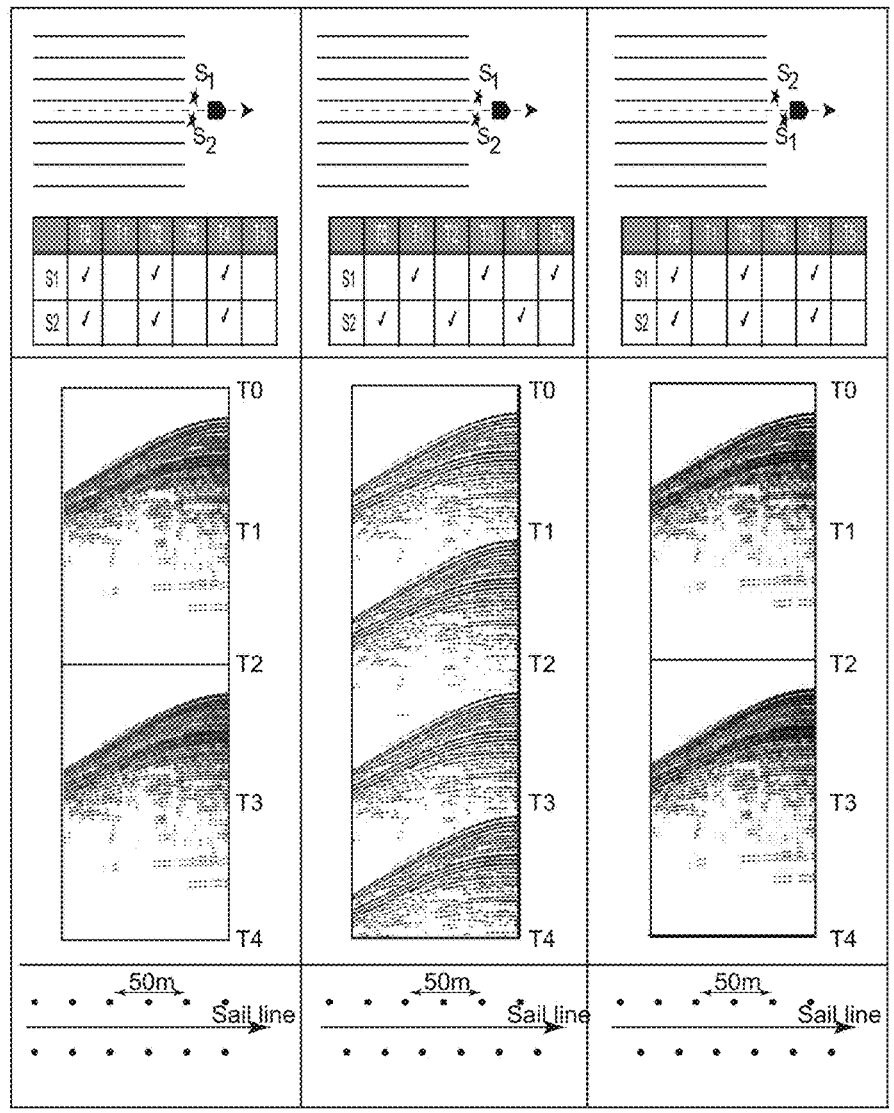

STAGGERED SOURCE ARRAY CONFIGURATION SYSTEM AND METHOD

CROSS REFERENCE TO RELATED APPLICATIONS

The present application claims the benefit of priority under 35 U.S.C. § 119(e) to U.S. Provisional Application No. 62/170,204, titled "Staggered source arrays configuration and simultaneous shooting strategy," filed on Jun. 3, 2015, the entire contents of which is hereby incorporated by reference into the present application.

TECHNICAL FIELD

Embodiments of the subject matter disclosed herein generally relate to methods and systems for marine seismic data acquisition and, more particularly, to mechanisms and techniques for towing source arrays in a staggered configuration for increasing the resolution of the acquired seismic data. This staggered configuration can be combined with the simultaneous firing of the towed source arrays.

BACKGROUND

Marine seismic data acquisition and processing techniques are used to generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. Thus, providing better image of the subsurface is an ongoing process and this process is an important tool for any oil and gas company that drill wells for exploring the oil and gas.

For a seismic gathering process, as shown in FIG. 1, a marine seismic data acquisition system 100 includes a survey vessel 102 towing a plurality of streamers 104 (one shown) that may extend over kilometers behind the vessel. One or more source arrays 106 may also be towed by the survey vessel 102 or another survey vessel (not shown) for generating seismic waves 108. Conventionally, the source arrays 106 are placed in front of the streamers 104, considering a traveling direction of the survey vessel 102. The seismic waves 108 generated by the source arrays 106 propagate downward and penetrate the seafloor 110, eventually being reflected by a reflecting structure 112, 114, 116, 118 at an interface between different layers of the subsurface, back to the surface 119. The reflected seismic waves 120 propagate upward and are detected by detectors 122 provided on the streamers 104. Although FIG. 1 shows the detectors 122 outside streamer 104, most traditional streamers house the detectors inside the streamer. The detectors may be hydrophones, geophones, accelerometers, optical fibers, etc. This process is generally referred to as "shooting" a particular seafloor 110 area.

A source array (or simply source in this document) is understood in this application to mean a plurality of source elements (typically air guns, but also possible vibratory elements or other known seismic wave generators) structured in a controlled way to have a certain geometry. The source array is towed by a vessel such that this geometry is preserved. FIG. 2 shows a bird view of a source array 206 that is towed by a streamer vessel 102. A streamer vessel is a vessel that tows streamers and, optionally, sources. A source vessel is a vessel that tows only sources, no streamers.

Source array 206 includes three sub-arrays 230, 240, and 250 (the source array may have more or less sub-arrays). Sub-array 230 includes a float 232 that floats at or below the water surface, and source elements (e.g., air guns) 234 connected to the float. Each sub-array has a similar geometric configuration. Source elements 234, 244, and 254 are distributed along the floats to have a certain geometry, e.g., they are distributed on a regular grid 260 having horizontal and vertical lines substantially perpendicular to each other. This geometry is maintained when the source array is towed by the vessel 102.

In a typical marine acquisition system, streamer vessel 102 tows two source arrays 206A and 206B, and plural streamers 104 as illustrated in FIG. 3. Each source array has the structure indicated in FIG. 2. Note that the traditional configuration is to have both source arrays having the same inline coordinate X1 and all the streamers to have their heads located at the same inline coordinate X2. The inline axis X indicates the vessel's travel direction.

The traditional seismic marine acquisitions share a common trait: a constraint imposed by the relationship between the number of source arrays, vessel speed, shot sampling and record length. Usually, temporal overlap between shot records is avoided, i.e., the firing time between consecutive shots is such that the shot records (from multiple shots) do not interfere in time with each other. A shot record is a collection of seismic data recorded in a given time window as a consequence of a single shot. No other shot is fired during the given time window. As a consequence, the source sampling is limited on the survey area (because it is not possible to shot the source more often than the given time window). A process for improving the source sampling requires significant extra acquisition time. Thus, due to the high cost of marine seismic acquisition, it is common practice to acquire data with a limited density of surface location.

A known way for increasing the shot point density is to fire the source arrays simultaneously, i.e., to allow temporal overlap between different shot records. Note that the term "simultaneously" is used herein to mean that two or more source arrays are shot exactly at the same instant T or they are shot within a time interval around instant T, where the time interval is significantly shorter than a record length of seismic data (e.g., the time interval is around 5 s and the record length of seismic data is around 10s, other values are possible). In case of simultaneous source acquisition, the recorded seismic data are blended (i.e., a seismic detector detects at the same time seismic waves originating from the two or more source arrays) and dedicated deblending algorithms are applied during the processing phase in order to separate the contribution of each seismic source array.

Accordingly, it would be desirable to provide systems and methods that increase the shots density and do no increase the acquisition time of the collected seismic data.

SUMMARY

According to an embodiment, there is a marine seismic acquisition system that includes a first vessel that follows an inline direction (X), a first source array (S1) configured to generate first seismic waves, and a second source array (S2) configured to generate second seismic waves. The first and second source arrays are towed by the first vessel along the inline direction (X) and a first inline distance (d) between (i) a first center of source (CS1) of the first source array (S1) and (ii) a second center of source (CS2) of the second source array (S2) is different from zero.

According to another embodiment, there is a method for calculating characteristics of a marine seismic survey. The method includes calculating a pre-plot direction to be followed by a vessel during the seismic survey for surveying an undersurface; calculating a first distance between a first source array (S1) that generates first seismic waves and the vessel; and calculating a second distance between a second source array (S2) that generates second seismic waves and the vessel. The first and second source arrays are towed by the vessel along the pre-plot direction with a cross-line distance (L), and a difference between the first distance and the second distance is equal to an inline distance (d).

According to still another embodiment, there is a non-transitory computer readable medium including computer executable instructions, wherein the instructions, when executed by a processor, implement instructions for calculating characteristics of a marine seismic survey as noted in the previous paragraph.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 7A-7C illustrate a wide azimuth seismic survey in which plural source arrays, all aligned relative to their respective towing vessel, are collecting wide azimuth data;

FIG. 8 illustrates the shot density and distribution for the source arrays of FIG. 4A when shot simultaneously;

FIG. 11A illustrates staggered dual seismic sources towed by a streamer vessel and FIG. 11B illustrates the shot density and distribution with the source arrays being shot simultaneously;

FIGS. 12A-12C compare the seismic data acquired with aligned dual seismic sources fired simultaneously, aligned dual seismic sources fired in a flip-flop manner, and staggered dual seismic sources fired simultaneously;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of a single vessel towing staggered dual source arrays. However, the embodiments to be discussed next are not limited to this configuration, but may be extended to other arrangements that include more or fewer streamer vessels and/or source vessels and more or fewer staggered source arrays. Also, some of the figures show a particular order of the streamer and source vessels along a cross-line direction. This order is exemplary and not intended to limit the embodiments.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a streamer or source vessel tows two or more source arrays and the source arrays are staggered along the inline direction relative to the towing vessel. In addition, the source arrays are shot simultaneously during the seismic survey.

More specifically, there is a method for acquiring marine seismic data with higher source/trace density. The method combines the use of staggered source arrays (towed by the same streamer or source vessel) and dedicated simultaneous shooting strategies. The method, as discussed later, increases the number of source points in a seismic survey without increasing the acquisition time. The method also improves the spatial resolution of the seismic data by changing the spatial resolution of the shots. In one application, the method provides a way to control (1) the spatial distribution of the source points (points where the source arrays are shot), and (2) the energy temporal distribution in the seismic records. In another application, the method is also useful for optimizing the use of some processing methods, such as deblending and regularization.

Figure 1:
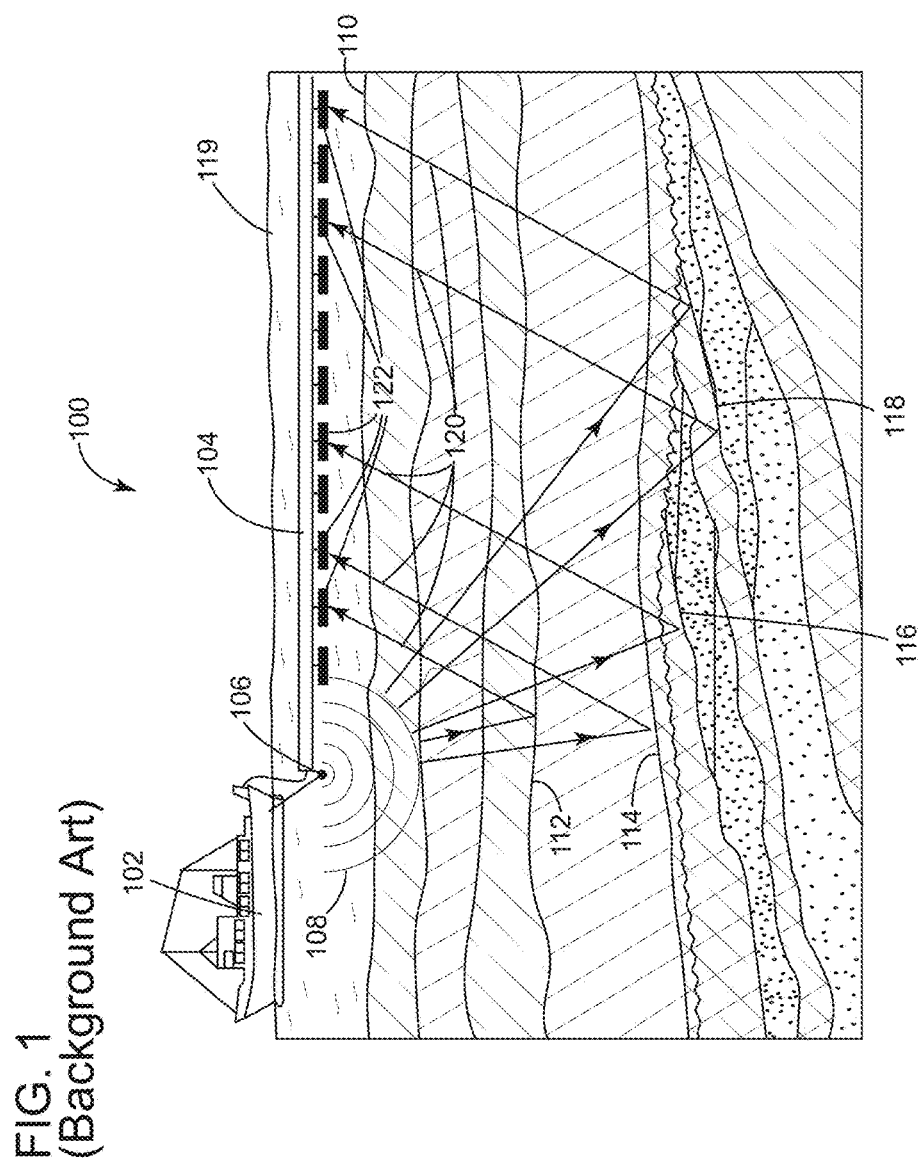
FIG. 1 is a schematic illustration of a marine seismic data acquisition system.
Figure 2:
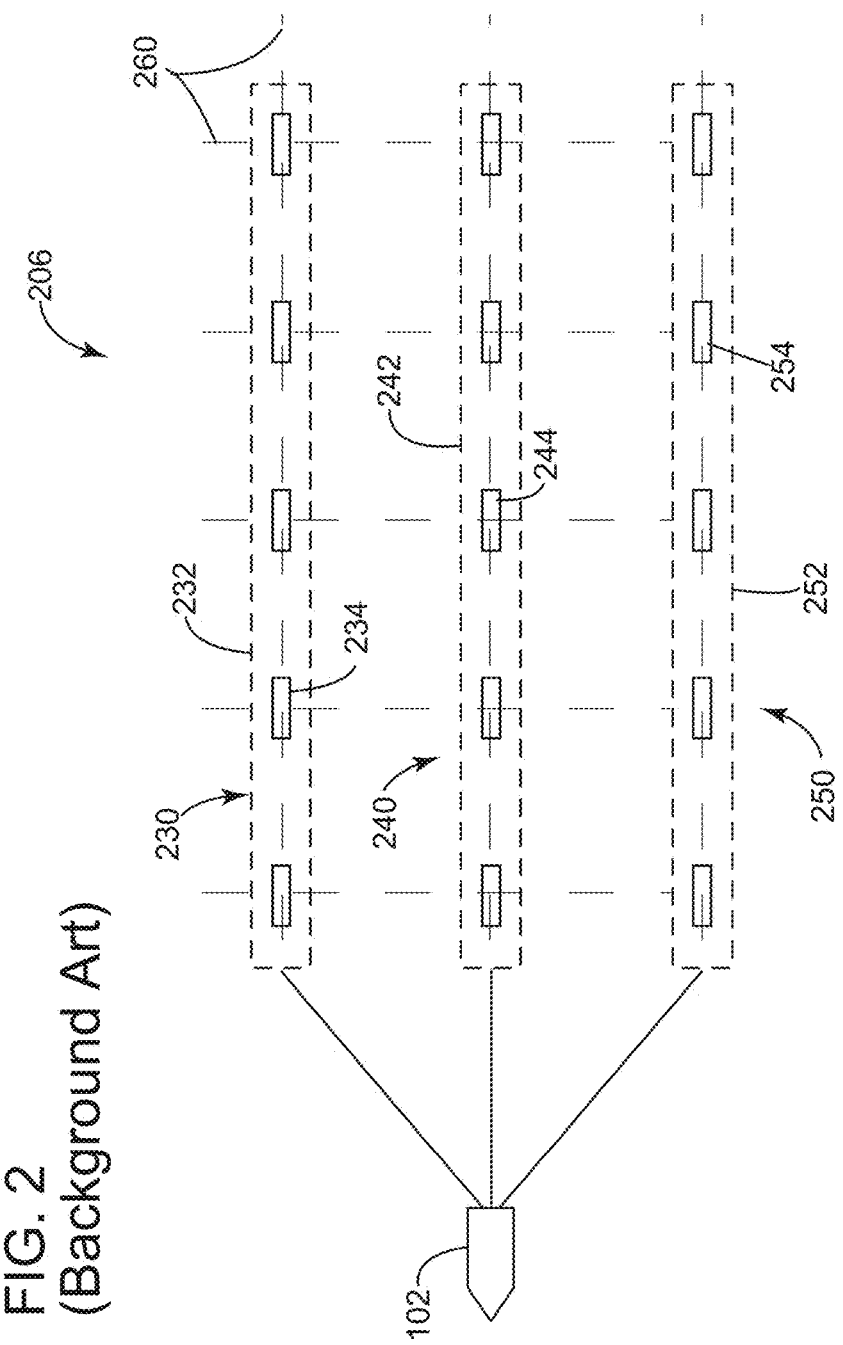
FIG. 2 is a bird view of a marine seismic data acquisition system.
Figure 3:
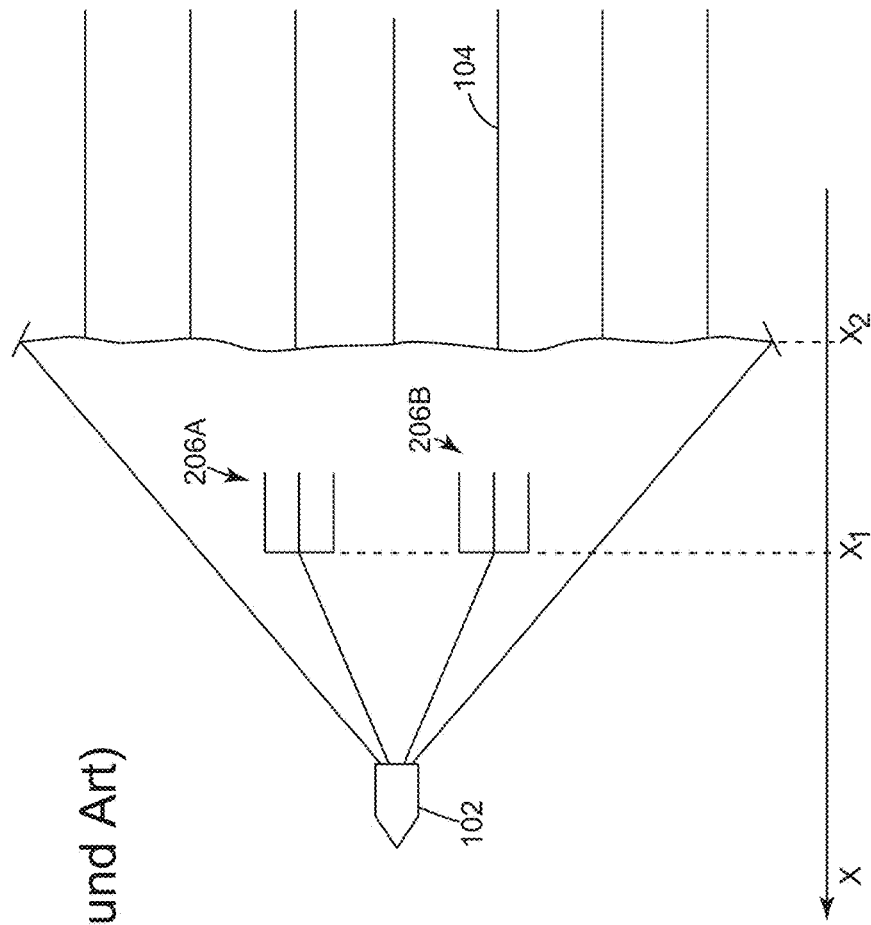
FIG. 3 illustrates a seismic data acquisition system that has one streamer vessel and two source arrays.
Figure 4B:
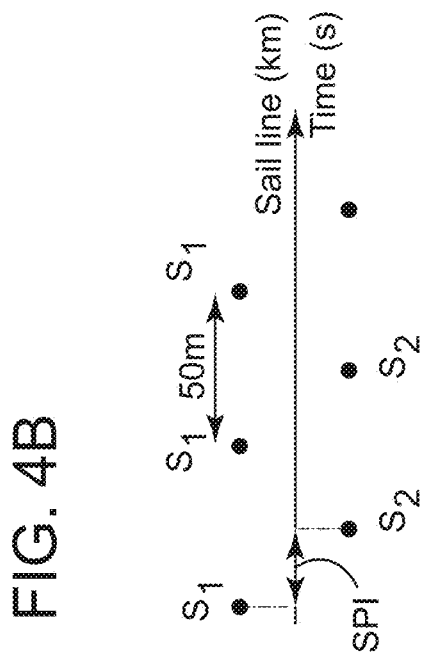
FIG. 4A schematically illustrates dual source arrays towed in an aligned manner and FIG. 4B illustrates the shot density and distribution when the source arrays are shot in a flip-flop manner.
Figure 4A:
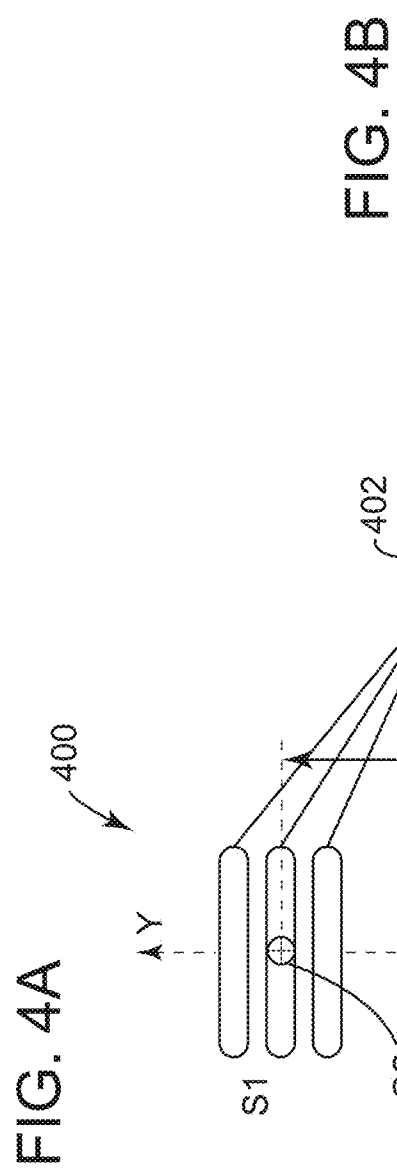

A source array configuration as shown in FIG. 4A uses two aligned source arrays S1 and S2, i.e., two source arrays having the same inline position relative to the towing vessel. Both source arrays S1 and S2 are towed by a same vessel 402 with a cross-line distance L. A cross-line direction Y is substantially perpendicular to inline direction X. Because each source array has a large spatial footprint, a center of source CS is defined for each source array. The center of source CS may be defined as the geometrical center of the source array's footprint, the gravity center of the source (in which the volume of each source element multiplies the position of the source element when calculating the geometrical center), the most proximal point of the source array relative to the towing vessel, etc. The seismic source arrays are alternately/sequentially activated every shot point interval. In this case, the shot point interval (SPI, which is the spatial distance along the inline direction between two consecutive shots) is 25 m. This SPI results in a 50 m interval between two successive activations of the same source array S1, as illustrated in FIG. 4B. (and 25 m interval between the activation of S1 and S2).

Figure 5B:
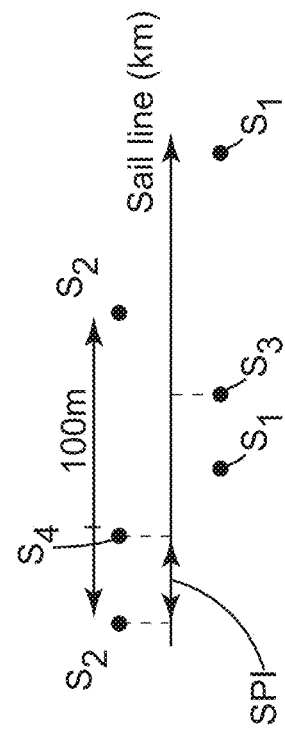
FIG. 5A schematically illustrates dual source arrays (aligned) towed by two vessels along a same inline path and FIG. 5B illustrates the shot density and distribution with the source arrays being shot in a sequential manner.
Figure 5A:
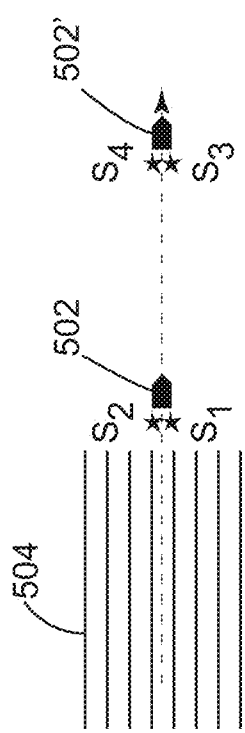

To improve the illumination of the seismic data, one or more source vessels towing respective source arrays may be added. This configuration is illustrated in FIGS. 5A and 5B, which show a marine seismic acquisition system 500 having a streamer vessel 502 and a source vessel 502'. Streamer vessel 502 tows streamers 504 and source arrays S1 and S2 while source vessel 502' tows only source arrays S3 and S4. Source arrays S1 and S2 have a common first inline coordinate while source arrays S3 and S4 have a common second inline coordinate, different from the first inline coordinate. This means that both source arrays S1 and S2 are aligned (i.e., located behind the towing vessel at the same inline position) and both source arrays S3 and S4 are aligned. If the distance between the first and second inline coordinates is about the length of the streamer (e.g., between 2 and 20 km), it is possible to obtain long offset ranges, which increase the illumination. However, this configuration may degrade the source density, i.e., the inline source sampling, as this quantity is doubled in comparison to the single vessel configuration illustrated in FIG. 4B. This is so because, as illustrated in FIG. 5B, with a conventional SPI of 25 m between two consecutive source arrays activations, any given source is fired every 4 shots, i.e., every 100 m. The shooting sequence in FIG. 5B is {S2, S4, S1, S3}. Any other shooting sequence may be used.

Figure 6B:
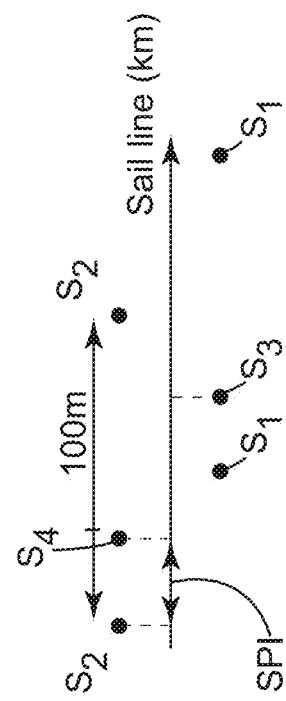
FIG. 6A schematically illustrates dual source arrays (aligned) towed by two vessels with a cross-line offset and FIG. 6B illustrates the shot density and distribution with the source arrays being shot in a sequential manner.
Figure 6A:
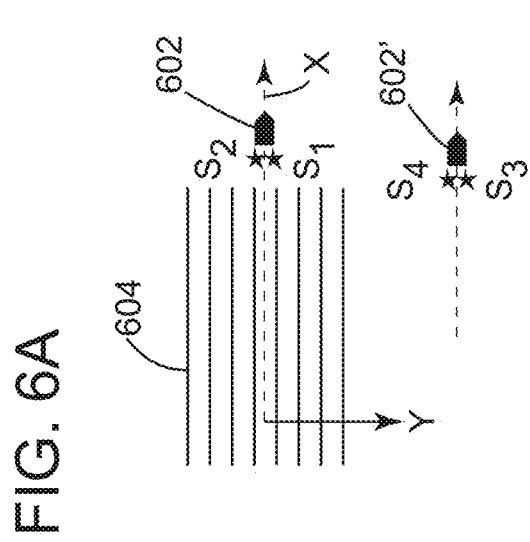

Other known acquisition designs face the same spatial density limitations as the aligned single vessel acquisition of FIGS. 4A and 4B or the aligned dual vessel acquisition of FIGS. 5A and 5B. For example, the aligned dual vessel acquisition 600 with the source vessel 602' positioned on the side of the streamers 604, as illustrated in FIGS. 6A and 6B, also increases the illumination by acquiring large cross-line offsets (see FIG. 6A), but the source density is degraded by increasing the successive shooting of any given source array to 100 m for an SPI of 25 m (see FIG. 6B). In this embodiment, the shooting sequence is {S2, S4, S1, S3}.

Similar to the above configurations, a high-density (HD) wide-azimuth survey (WAZ), which is illustrated in FIGS. 7A-7C (FIG. 7A illustrates pass no. 3, FIG. 7B illustrates pass no. 2, and FIG. 7C illustrate pass no. 1 of the vessels, where the three passes are repeated during the seismic survey over the same plot line), achieves a low inline sampling because of the use of two source vessels 702' and 703" in aligned dual source configuration for each acquisition pass (this type of marine acquisition is disclosed in details in U.S. Patent Application Publication no. 2014/0241118, assigned to the same assignee as this disclosure). The sources are sequentially activated during the three successive passes with a shot time interval of about 10 s. For all passes, the seismic vessels are in aligned dual source array configuration.

The source arrays discussed in FIGS. 4A-7C may be shot in a blended acquisition manner, i.e., with full or partial temporal overlap of the seismic data in the seismic records (simultaneously). Note that the cases discussed above have been assumed to shoot the source arrays in a flip-flop manner, i.e., shot one source array, wait until all the signals are recorded, then shot the next source array, wait until all the signals are recorded, and so on. The simultaneous or blended manner does not fully wait until all the signals generated by a first source array are recorded before shooting the next source array. This means that the second source array starts shooting while the detectors on the streamers are still recording signals associated with the first source array. For instance, in the case of the single vessel configuration as illustrated in FIGS. 4A and 4B, the nearly simultaneous activation of the two sources S1 and S2 results in a twice denser shot location pattern as illustrated in FIG. 8. However, the inline distance between two activations of S1 or S2 remains 25 m.

As discussed above, by "simultaneous activation" or "nearly simultaneous activation" of the seismic sources it is understood that both source arrays are fired during a small time window; a typical size for this time window may be [−1 s, +1 s]. The small time delay between the source arrays activations may change from shot to shot, and it is fully specified and controlled by the operator prior the survey. The time delay may be also be zero.

Figure 9A:
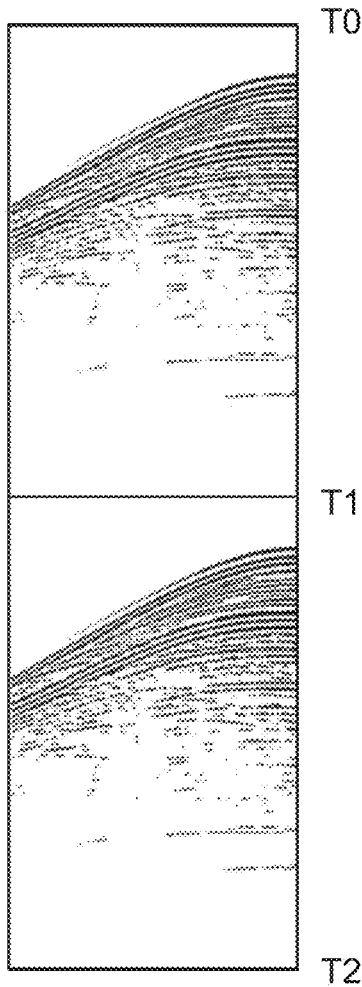
FIG. 9A illustrates seismic data acquired by shooting the source arrays sequentially and FIG. 9B illustrates the seismic data acquired by shooting the source array simultaneously.
Figure 9B:
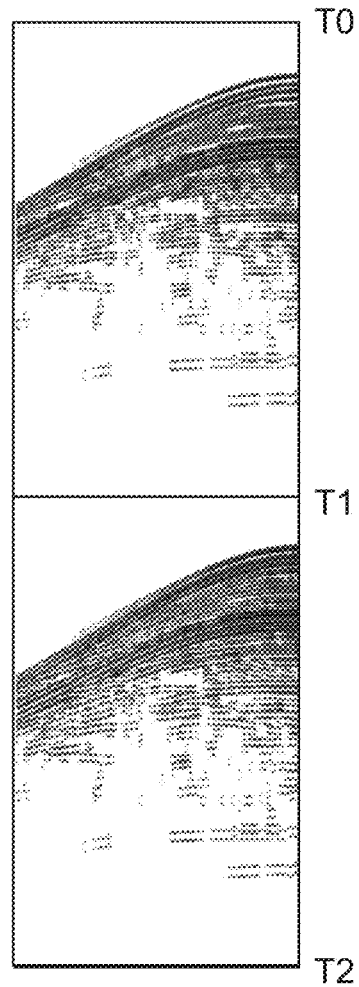

FIGS. 9A and 9B illustrate the impact on the seismic data of firing the two source arrays simultaneously, compared to conventional non-blended data. In this respect, FIG. 9A shows the seismic data obtained with the two source arrays being activated sequentially, while FIG. 9B shows that, because the two source arrays are activated nearly simultaneously and the locations of the two sources are quite close to each other, the contribution of the two sources are superimposed in the seismic record and thus, the resulting shot gathers look blurred. However, dedicated processing algorithms (e.g., coherency filters) allow to separate the contribution of each seismic source. In the case of multi-vessel acquisition in dual source configuration, the use of simultaneous sources allow to improve the inline sampling as for single vessel acquisition.

Figure 10:
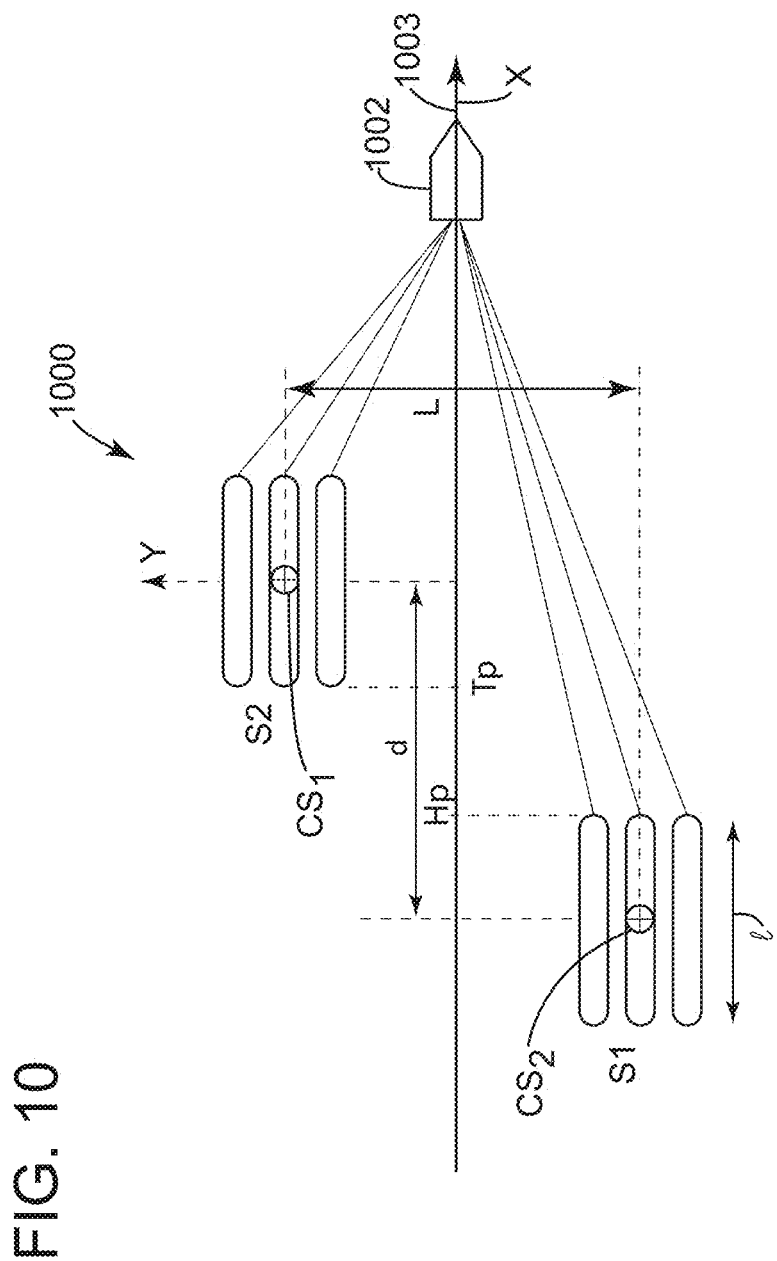
FIG. 10 illustrates staggered dual seismic sources towed by a same vessel.

According to an embodiment illustrated in FIG. 10, a staggered source array configuration 1000 towed by a single vessel (source or streamer vessel) that uses a dedicated simultaneous shooting scheme includes two or more source arrays S1 and S2 having different inline coordinates (i.e., the sources are staggered). The coordinates of the source arrays may be associated with a center of source point CS, or a head end HP of the source array or a tail end TP of the source array, etc. If the center of source point is chosen to describe the location of the source array, FIG. 10 shows that the two source arrays S1 and S2 are towed by a single vessel 1002 along a pre-plot path 1003 (which happens to coincide with the inline direction X), and both the inline offset (separation) and the cross-line offset (separation) between points CS1 and CS2 are different from zero. The inline offset is described by distance "d" and the cross-line offset is described by distance L. In one embodiment, both distances d and L are different from zero. Vessel 1002 may be a streamer or a source vessel.

The configuration shown in FIG. 10 allows to increase the number of source points (shots) and to improve the resolution of the data; the configuration also provides a way to control (1) the spatial distribution of the source points and (2) the energy distribution in the seismic records. This configuration is also useful for optimizing the use of some processing methods, such as deblending and regularization.

FIG. 10 shows a staggered dual source arrays set-up. In one application, the inline offset d between the centers of sources CS1 and CS2 is a multiple of the shot point interval (SPI). Note that the SPI may be calculated as the ratio of (1) the number of shots per cycle and (2) the length of the sailed distance for the cycle. With this definition, FIG. 4A shows 2 shots over 50 m, which results in an SPI=25 m, FIGS. 5A and 6A show 4 shots over 100 m, which results in an SPI=25 m, FIG. 7 shows 4 shots over 100 m, which results in an SPI=25 m and FIG. 11A shows 2 shots over 25 m, which results in an SPI=12.5 m. In the same application, the cross-line distance L, between the centers of sources, is half the streamer separation (the streamer separation is the distance, along the cross-line direction, between two consecutive streamers), e.g., 50 m. The embodiment illustrated in FIG. 10 is compatible with the fan mode acquisition (streamer are not parallel, but they are distributed in a fan configuration), with simultaneous source technology, and with broadband acquisition (the streamers have a variable depth profile).

In one application, inline offset distance d is larger than a length "l" of the source array. In still another application, the inline offset distance d has a value such that there is space between the tail end TP of the first source array S1 and a head end HP of the second source array S2, as illustrated in FIG. 10. In still another application, the single vessel acquisition geometry in staggered dual source configuration of FIG. 10 is used for acquiring high-density NAZ seismic data.

The staggered two source arrays illustrated in FIG. 10 may be activated nearly simultaneously and in one embodiment, the two source arrays are shifted from each other in the inline direction by inline offset distance d, defined as follows:

$$d = (2N+1) \text{ SPI},$$

where SPI is the shot point interval and N is an integer, positive or null. For example, d =12.5 m or d is at least 12.5 m. The acquisition configuration is illustrated in FIG. 11A and the resulting shot point pattern is shown in FIG. 11B. The shot density is similar to that obtained in the case of simultaneous shooting with the two source arrays aligned (see FIGS. 4A and 4B), but the spatial distribution of the shot points is different: it is more uniform and the inline sampling is twice finer compared to conventional sequential flip/flop acquisition (see FIG. 4B). In this case, the inline distance between two shot locations from S1 and S2 is 12.5 m, which results in an improvement of the seismic resolution.

Note that a similar shot point pattern can be obtained with a sequential shooting mode by activating the source arrays more often compared to a conventional acquisition; however, in this case, the distribution of the shots in the seismic records is different and may be not be suitable for existing deblending algorithms.

The seismic data acquired with three different configurations is illustrated in FIGS. 12A-12O. FIG. 12A shows the seismic data collected with a single vessel, aligned dual source array, simultaneously shot. FIG. 12B shows the seismic data collected with a single vessel, aligned dual source array, shot in a flip-flop manner. FIG. 12C shows the seismic data collected with a single vessel, staggered dual source array, shot simultaneously. It can be seen from the figures that the seismic data in FIG. 12C combines the (1) full temporal overlap of the simultaneous shots in the seismic records (suitable for some deblending algorithms) with (2) the optimal uniform distribution of the shot locations. In other words, the seismic data in FIG. 12A lacks the uniform distribution of the shot locations (see bottom of the figure) while the seismic data in FIG. 12B lacks the temporal overlap of the shots (see top of the figure).

Figure 13A:
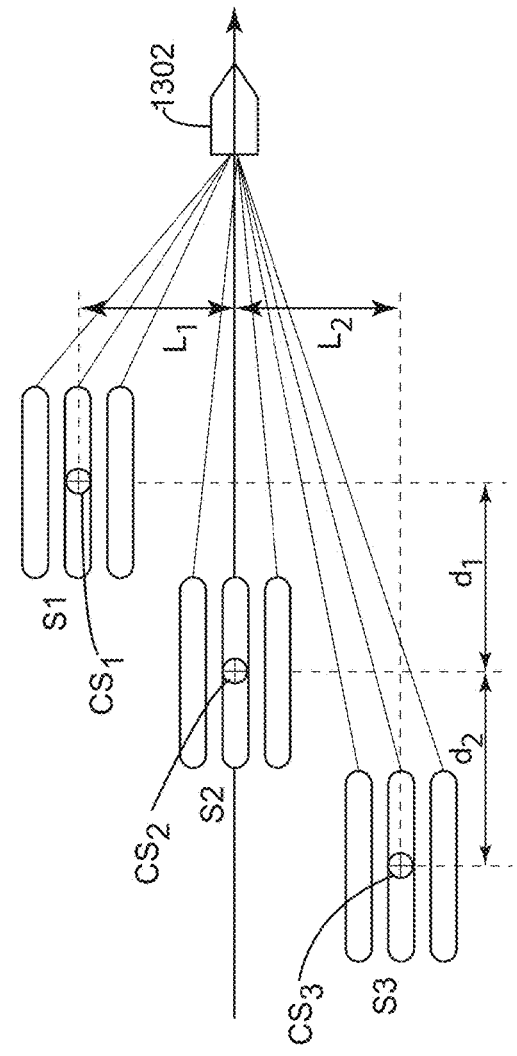
FIG. 13A illustrates staggered multiple seismic sources towed by a same vessel and FIG. 13B illustrates the shot density and distribution with the source arrays being shot simultaneously.

In another embodiment illustrated in FIG. 13A, the spatial resolution of the recorded seismic data is further improved by towing additional seismic source arrays behind the vessel. FIG. 13A shows a system 1300 in which a vessel 1302 tows three staggered source arrays S1 to S3. The cross-line distances $L_1$ and $L_2$ between adjacent source arrays may be equal to a third of the streamer separation and the inline distances $d_1$ and $d_2$ may be different or not.

Figure 13B:
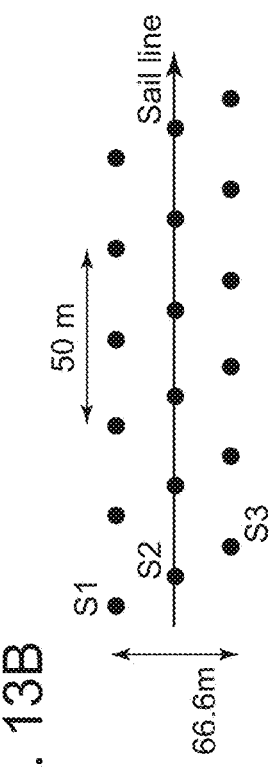

In this configuration, the three source arrays S1 to S3 are activated nearly simultaneously on predefined positions. The time delay between two successive simultaneous activations of the source arrays corresponds to the time needed by the vessel to sail a given distance, for instance 25 m. The corresponding high resolution shot pattern is illustrated in FIG. 13B.

Figure 15:
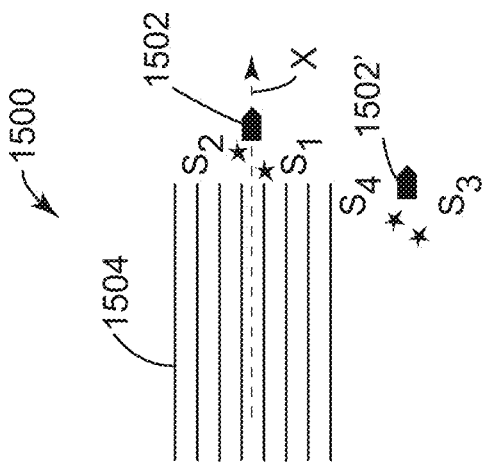
FIG. 15 illustrates multiple staggered dual source arrays being towed about different paths.
Figure 14:
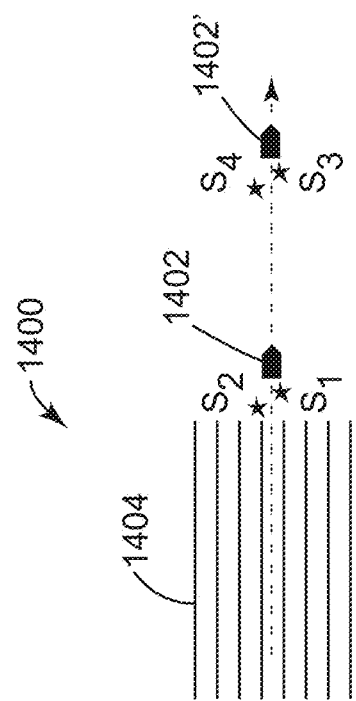
FIG. 14 illustrates multiple staggered dual source arrays being towed along a same path.

In yet another embodiment illustrated in FIGS. 14 and 15, multi-vessel acquisition systems with each vessel towing two staggered source arrays each is considered. This configuration is combined with the simultaneous firing of the source arrays. In this way, the inline distance between two neighboring shot points is reduced compared to the case of conventional acquisition where the sources are activated in a sequential mode.

An example of a multi-vessel acquisition system 1400 with staggered source arrays S1 and S2 towed by vessel 1402 and staggered source arrays S3 and S4 towed by vessel 1402' is shown in FIG. 14. In this case, the inline distance d between the source arrays S1 and S2 is equal to 25 m. The shooting sequence may be as follows: sources S1 and S2 are fired simultaneously, then after the two vessels sailed 25 m, sources S3 and S4 are fired simultaneously, and then the sequence is repeated. Note that the resulting shot location pattern with the configuration shown in FIG. 14 is similar to that obtained with the conventional/aligned dual source configuration (see FIGS. 5A and 5B). However in this case, the distribution of the seismic energy in the seismic shot gathers is different.

Another embodiment is illustrated in FIG. 15, in which the streamer vessel 1502 tows staggered source arrays S1 and S2 and source vessel 1502' tows staggered source arrays S3 and S4. Source vessel 1502' is located away from the streamer vessel 1502, along the cross-line direction. Source vessel 1502' may be located in front or behind, along the inline direction, relative to the streamer vessel 1502.

Figures 16A, 16B:
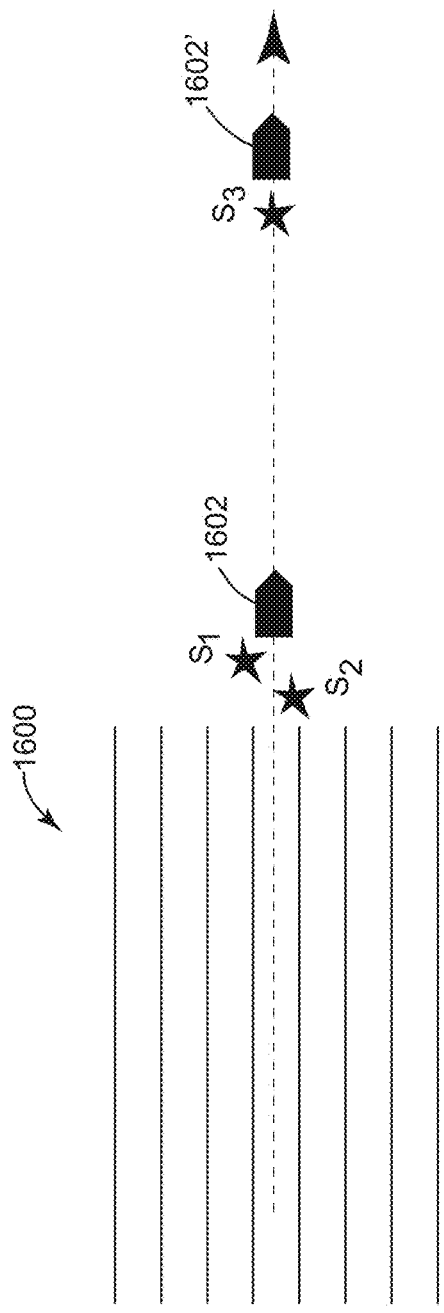
FIG. 16A illustrates a mixed of staggered dual source arrays and aligned dual source arrays being towed by respective vessels and FIG. 16B illustrates the shooting of the source arrays.

Other multi-vessel configurations may be imagined by those skilled in the art. For example, as illustrated in FIG. 16A, it is possible to acquire long offsets with a mixed source arrays configuration system, which includes a streamer vessel 1602 and a source vessel 1602' that follow a same pre-plot X. While the streamer vessel 1602 tows staggered dual source arrays S1 and S2, the source vessel tows a single source array S3. In another embodiment, the streamer vessel tows a single source array and the source vessel tows a staggered dual source array. While these embodiments show only one streamer vessel and one source vessel, it is possible to have more of these vessels. Also, it is possible that a streamer or/and source vessel tows more than two staggered source arrays. In one embodiment, one vessel tows staggered dual source arrays while the other vessel tows aligned dual source arrays. FIG. 16B illustrates the firing timing for the three sources S1 to S3 shown in FIG.

16A. Note that staggered source arrays S1 and S2 are shot simultaneously while source array S3 is shot in a flip-flop manner relative to source arrays S1 and S2.

The vessels may follow straight paths (pre-plot sail lines) or curved paths having amplitudes, periods and phases that may or may not be the same. The amplitudes, periods, and phases for the curved paths may be optimized to obtain better azimuth and offset diversity for the recorded data. However, it is possible that only the streamer vessels follow the curved path and the source vessels follow a straight line path, or the other way around, or any other combination, as long as the azimuth and/or offset distribution of the collected seismic data is improved relative to the existing acquisition systems, see for example, U.S. Patent Application Publication No. 2013/0188448.

Figure 17:
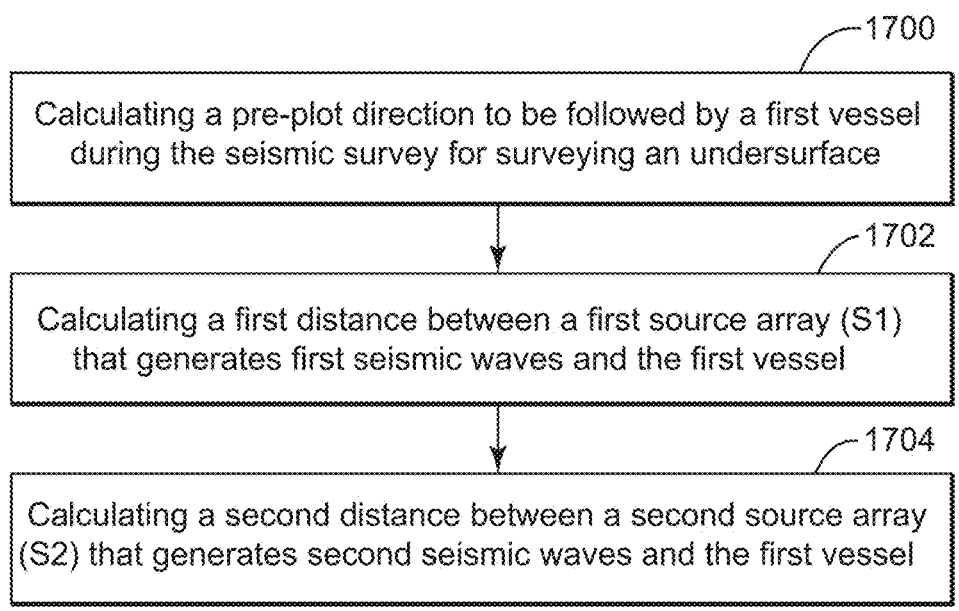
FIG. 17 is a flowchart of a method for planning a seismic survey with staggered source arrays towed by a same vessel.

A method for planning a marine seismic survey based on one of the embodiments discussed above is now discussed with regard to FIG. 17. The method includes a step 1700 of calculating a pre-plot direction to be followed by a first vessel (1002) during the seismic survey for surveying an undersurface, a step 1702 of calculating a first distance between a first source array (S1) that generates first seismic waves and the first vessel, and a step 1704 of calculating a second distance between a second source array (S2) that generates second seismic waves and the first vessel. The first and second source arrays are towed by the first vessel along the pre-plot direction with a cross-line distance (L), and a difference between the first distance and the second distance is equal to an inline distance (d). In one application, the first distance is considered to extend between a first center of source (CS1) of the first source array (S1) and a reference point on the vessel, and the second distance is considered to extend between a second center of source (CS2) of the second source array (S2) and the reference point on the vessel. In another application, the inline distance (d) is larger than a length of the first source array. The inline distance (d) may be calculated to be a multiple of a shot point interval used to fire the first and second source arrays, or the inline distance (d) is calculated to be an odd multiple of a shot point interval used to fire the first and second source arrays, or the first inline distance (d) is at least 12.5 m.

Figure 18:
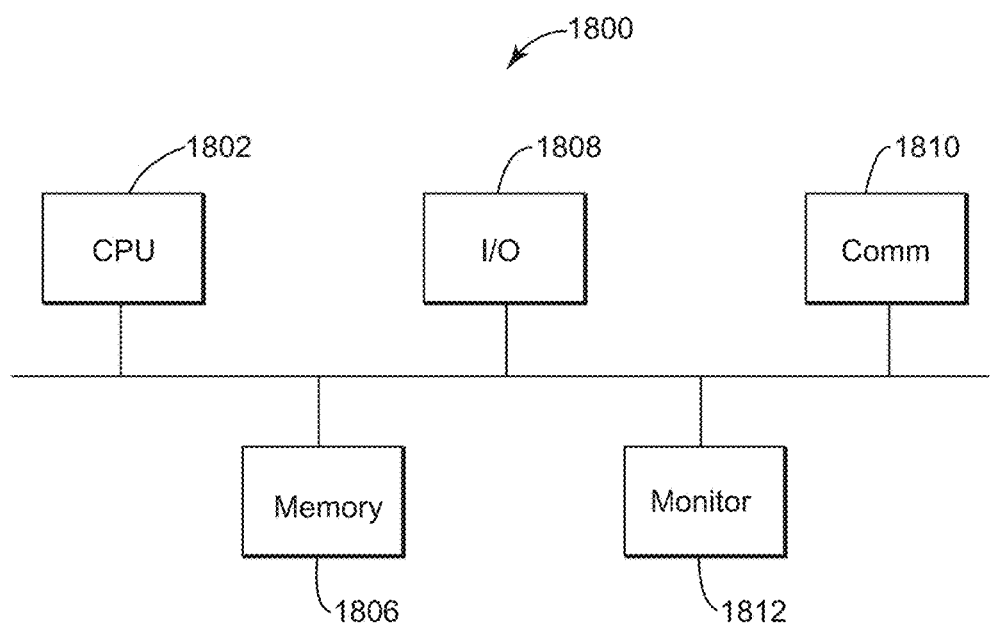
FIG. 18 is a schematic illustration of a computing device to implement various methods described herein.

The methods and algorithms discussed above may be implemented in a computing device 1800 as illustrated in FIG. 18. The computing device 1800 may be a processor, a computer, a server, etc. The computing device 1800 may include a processor 1802 connected through a bus 1804 to a storage device 1806. The storage device 1806 may be any type of memory and may store necessary commands and instructions associated with firing the sources as discussed above. Also connected to the bus 1804 is an input/output interface 1808 through which the operator may interact with the sources, for example, for shooting them. A communication interface 1810 is also connected to the bus 1804 and is configured to transfer information between the processor 1802 and an outside network, Internet, operator's internal network, etc. The communication interface 1810 may be wired or wireless. Optionally, computing device 1800 may include a screen 1812 for displaying various results generated by the algorithms discussed above. For example, the positions of the sources may be displayed, after being calculated with the novel algorithms, on the screen 1812.

The above-disclosed exemplary embodiments provide a system and a method for improving source points density and/or spatial distribution. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine seismic acquisition system comprising:
a first vessel that follows an inline direction (X);
a first source array (S1) configured to generate first seismic waves; and
a second source array (S2) configured to generate second seismic waves,
wherein
the first and second source arrays are towed by the first vessel parallel to and on either side of the inline direction (X),
a first inline distance (d) between (i) a first center of source (CS1) of the first source array (S1) and (ii) a second center of source (CS2) of the second source array (S2) is different from zero, and
a cross-line distance (L) between the first center of source and the second center of source, along a cross-line direction (Y) perpendicular to the inline direction, is different from zero.

2. The system of claim 1, wherein the first inline distance (d) is larger than a length (I) of the first source array.

3. The system of claim 1, wherein the first inline distance (d) is calculated to be a multiple of a shot point interval used to fire the first and second source arrays.

4. The system of claim 1, wherein the first inline distance (d) is calculated to be an odd multiple of a shot point interval used to fire the first and second source arrays.

5. The system of claim 1, wherein the first inline distance (d) is at least 12. 5 m.

6. The system of claim 1, wherein the first center of source (CS1) of the first source array (S1) is a geometric center of a footprint of the first source array.

7. The system of claim 6, wherein the first source array includes plural source elements, each configured to generate a corresponding seismic wave.

8. The system of claim 7, wherein the plural source elements extend along three parallel lines, each parallel with the inline direction.

9. The system of claim 1, wherein the first inline distance (d) is different from the cross-line distance (L).

10. The system of claim 1, wherein the first and second source arrays are shot simultaneously.

11. The system of claim 1, further comprising:
a third source array (S3) towed by the first vessel, wherein there is a second inline distance (d2) between the third source array and the second source array along the inline direction, that is not zero.

12. The system of claim 11, wherein the second inline distance (d2) is different from the first inline distance (d).

13. The system of claim 1, further comprising:
a second vessel moving in parallel with the first vessel and towing third and fourth source arrays that are offset along the inline direction relative to the second vessel.

14. A method for calculating characteristics of a marine seismic survey, the method comprising:
calculating a pre-plot direction to be followed by a vessel during the seismic survey for surveying an undersurface;
calculating a first inline distance between a first source array (S1) that generates first seismic waves and the vessel; and
calculating a second inline distance between a second source array (S2) that generates second seismic waves and the vessel,
wherein the first and second source arrays are towed by the vessel parallel to and on different sides of the pre-plot direction with a cross-line distance (L) therebetween, and a difference between the first inline distance and the second inline distance is equal to an inline distance (d) that is different from zero.

15. The method of claim 14,
wherein the first inline distance is considered to extend between a first center of source (CS1) of the first source array (S1) and a reference point on the vessel, and
wherein the second inline distance is considered to extend between a second center of source (CS2) of the second source array (S2) and the reference point on the vessel.

16. The method of claim 14, wherein the inline distance (d) is larger than a length of the first source array.

17. The method of claim 14, wherein the inline distance (d) is calculated to be a multiple of a shot point interval used to fire the first and second source arrays.

18. The method of claim 14, wherein the inline distance (d) is calculated to be an odd multiple of a shot point interval used to fire the first and second source arrays.

19. The method of claim 14, further comprising:
shooting simultaneously the first and second source arrays while being towed by the vessel with the first and second distances.

20. A non-transitory computer readable medium including computer executable instructions, wherein the instructions, when executed by a processor, implement instructions for calculating characteristics of a marine seismic survey, the instructions comprising:
calculating a pre-plot direction to be followed by a vessel during the seismic survey for surveying an undersurface;
calculating a first inline distance between a first source array (S1) that generates first seismic waves and the vessel; and
calculating a second inline distance between a second source array (S2) that generates second seismic waves and the vessel,
wherein the first and second source arrays are towed by the vessel parallel to and on different sides of the pre-plot direction with a cross-line distance (L) therebetween, and a difference between the first inline distance and the second inline distance is equal to an inline distance (d) that is different from zero.

* * * * *